(12) United States Patent
Allam et al.

(10) Patent No.: US 10,260,416 B2
(45) Date of Patent: Apr. 16, 2019

(54) SYSTEMS AND METHODS FOR POWER PRODUCTION INCLUDING ION TRANSPORT COMPONENTS

(71) Applicant: 8 Rivers Capital, LLC, Durham, NC (US)

(72) Inventors: Rodney John Allam, Lanhill House (GB); Glenn William Brown, Jr., Durham, NC (US); Benjamin Hoff, Brookline, MA (US)

(73) Assignee: 8 Rivers Capital, LLC, Durham, NC (US)

(*) Notice: Subject to any disclaimer, the term of this patent is extended or adjusted under 35 U.S.C. 154(b) by 35 days.

(21) Appl. No.: 15/689,591

(22) Filed: Aug. 29, 2017

(65) Prior Publication Data

US 2018/0058318 A1 Mar. 1, 2018

Related U.S. Application Data

(60) Provisional application No. 62/381,907, filed on Aug. 31, 2016.

(51) Int. Cl.

| | |
|---|---|
| *F02C 3/34* | (2006.01) |
| *F02C 6/02* | (2006.01) |
| *F02C 7/224* | (2006.01) |
| *F25J 3/04* | (2006.01) |
| *F02C 1/06* | (2006.01) |
| *F02C 3/30* | (2006.01) |
| *F23L 7/00* | (2006.01) |

(52) U.S. Cl.
CPC ............. *F02C 3/34* (2013.01); *F02C 1/06* (2013.01); *F02C 3/305* (2013.01); *F02C 6/02* (2013.01); *F02C 7/224* (2013.01); *F23L 7/007* (2013.01); *F25J 3/04018* (2013.01); *F25J 3/04066* (2013.01); *F05D 2220/76* (2013.01); *F05D 2260/61* (2013.01)

(58) Field of Classification Search
CPC .... F02C 3/34; F02C 6/02; F02C 7/224; F02C 3/305; F02C 1/06; F25J 3/04066; F25J 3/04018; F23L 7/007; F05D 2220/76; F05D 2260/61
USPC ......... 60/39.2, 39.511, 39.52, 650, 682–684, 60/772

See application file for complete search history.

(56) References Cited

U.S. PATENT DOCUMENTS

| | | | |
|---|---|---|---|
| 4,498,289 A | 2/1985 | Osgerby | |
| 5,174,866 A * | 12/1992 | Chen | B01D 53/326 204/295 |
| 5,976,223 A * | 11/1999 | Prasad | B01D 53/22 95/117 |
| 8,596,075 B2 | 12/2013 | Allam et al. | |

(Continued)

FOREIGN PATENT DOCUMENTS

| | | |
|---|---|---|
| EP | 0663 230 | 7/1995 |
| EP | 0 916 386 | 5/1999 |

*Primary Examiner* — Hoang M Nguyen
(74) *Attorney, Agent, or Firm* — Womble Bond Dickinson (US) LLP

(57) ABSTRACT

The present disclosure relates to systems and methods for power production utilizing an ion transfer membrane (ITM) unit. An air stream and a fuel stream can be passed through the ITM unit so that the fuel is at least partially oxidized or combusted to form an outlet stream comprising $CO_2$. The $CO_2$ stream can be compressed and expanded to generate power.

32 Claims, 7 Drawing Sheets

(56) References Cited

U.S. PATENT DOCUMENTS

| | | | |
|---|---|---|---|
| 2011/0179799 A1* | 7/2011 | Allam | F25J 3/04018 |
| | | | 60/772 |
| 2012/0031100 A1 | 2/2012 | Allam | |
| 2012/0117979 A1 | 5/2012 | Allam | |
| 2013/0047629 A1* | 2/2013 | Anand | F02C 3/28 |
| | | | 60/783 |
| 2014/0007586 A1 | 1/2014 | Allam | |
| 2014/0053529 A1* | 2/2014 | Allam | F23D 1/00 |
| | | | 60/39.182 |
| 2014/0150444 A1 | 6/2014 | Allam | |
| 2016/0177821 A1 | 6/2016 | Allam | |

* cited by examiner the present application claims priority to U.S. Provisional
SYSTEMS AND METHODS FOR POWER PRODUCTION INCLUDING ION TRANSPORT COMPONENTS

CROSS-REFERENCE TO RELATED APPLICATIONS

The present application claims priority to U.S. Provisional Patent App. No. 62/381,907, filed Aug. 31, 2016, the disclosure of which is incorporated herein by reference.

FIELD OF THE DISCLOSURE

The present disclosure is directed to systems and methods for power production. In particular, power production may be carried out wherein oxygen for use in fuel combustion is at least partially provided by oxygen diffusion through an oxygen ion transport membrane.

BACKGROUND

Systems and methods for power generation utilizing combustion of carbonaceous or hydrocarbon fuel(s) with carbon dioxide as a working fluid are described in U.S. Pat. No. 8,596,075 to Allam et al., which is incorporated herein by reference. Such systems and methods utilize a high-pressure recuperative Brayton system with $CO_2$ as a working fluid wherein substantially pure oxygen is used for the combustion of fuel at high pressures (e.g., approximately 200 bar to 400 bar) and high temperatures (e.g., about 600° C. to about 1,600° C.). In some examples, the fuel may be natural gas (i.e., a hydrocarbon gas mixture consisting primarily of methane), and/or a fuel derived from the partial oxidation of coal, biomass and/or residual petroleum refining products such as, for example, heavy residual oil fractions or petroleum coke. The combustion product stream at such pressures and temperatures is expanded across a turbine with an outlet pressure of about 20 bar to about 40 bar. The expanded stream can then be cooled (e.g., with a recuperative heat exchanger) and treated for removal of water or other impurities to provide a substantially pure stream of $CO_2$, which can be compressed and reheated (e.g., against the turbine outlet stream in the recuperative heat exchanger) before being recycled into the combustor. Optionally, part or all of the $CO_2$ may be withdrawn for sequestration and/or secondary uses, such as enhanced oil recovery, as described in U.S. Pat. No. 8,869,889 to Palmer et al., the disclosure of which is incorporated herein by reference. Such power cycles can provide high efficiency power production with capture of substantially produced $CO_2$. For example, such power production cycle combusting natural gas to provide a turbine inlet stream at a pressure of 300 bar and a temperature of 1,150° C. and a turbine outlet stream at a pressure of 30 bar can exhibit a net efficiency (on a lower heating value basis) of about 59% with complete carbon capture. This high efficiency is achieved in part by introducing a second heat input at a temperature level below about 400° C. to compensate for the large difference between the specific heat of $CO_2$ at lower temperatures at the high and low pressure used in the system.

A key requirement for such power cycles is large quantities of substantially pure, highly pressurized gaseous oxygen. A 300 MW power production plant working under conditions as discussed above typically requires about 3,500 metric tons per day (MT/D) of oxygen at 99.5% purity and 30 bar minimum pressure produced from a cryogenic air separation plant. The inclusion of an oxygen plant significantly increases the capital cost of a power production system operating as described above and also consumes a large quantity of power during operation of the power production cycle. As noted above, such systems and methods have been shown to provide increased efficiency through addition of heat that is not recuperated from the combustion product stream. In some embodiments, the added heat may be derived from adiabatic heat produced by compressors that increase the pressure of an inlet air stream in a cryogenic oxygen production process and additionally heat derived from at least part of the $CO_2$ recycle compression. Nevertheless, there still remains a need in the art for further power production cycles that can achieve high efficiency with substantially complete carbon capture and can be implement with reduced capital expenditures and operating costs.

SUMMARY OF THE DISCLOSURE

The present disclosure relates to systems and methods for power production wherein oxygen can be provided for the combustion of a fuel without the requirement of a cryogenic air separation plant. In one or more embodiments, oxygen may be derived from an air stream (or other relatively low oxygen concentration stream) via ion transport. For example, certain mixed oxide ceramic compositions with perovskite or brown-millerite crystal structure operating at temperatures above about 750° C. have the ability to diffuse oxygen from a region of high oxygen activity coefficient to low oxygen activity coefficient. The composition of mixed oxide ceramics can be chosen so that there are vacancies in the crystal lattice where oxygen ions would normally be present. This may be achieved, for example, with monovalent, divalent, or trivalent metallic oxides mixed to achieve crystal lattice variances that allow the crystal structure to remain stable.

The systems and methods of the present disclosure can eliminate the need for one or more pieces of equipment that has been believed to be necessary for high efficiency oxyfuel combustion, such as a cryogenic air separation unit to provide high purity oxygen and/or a high pressure oxyfuel combustor to heat a pressurized working fluid stream prior to expansion for power production. The elimination of such elements can provide for significant cost savings both in equipment costs and operating costs. The presently disclosed power cycles can provide for operation of the power producing turbine at a much lower inlet temperature which will allow the possible elimination of internal $CO_2$ cooling streams within the turbine blades and the inner turbine casing with consequent increase in turbine efficiency and reduction in capital cost.

In one or more embodiments, the present systems and methods can eliminate the need for a high-pressure fuel gas compressor by introducing fuel gas into the system at the turbine discharge pressure. For example, a natural gas fuel may be provided directly from the natural gas pipeline at approximately 30 bar pressure.

In still further embodiments, the present systems and methods can eliminate the need for a separate dilution of the supplied oxygen in order to control the adiabatic flame temperature in the combustor. For example, known systems can mix $CO_2$ with the oxygen stream, and this can require a separate $CO_2+O_2$ compression train and a separate stream in the recuperative heat exchanger. According to embodiments of the present disclosure, however, there is no requirement for a $CO_2+O_2$ compression train.

In an exemplary embodiment, fuel combustion may be achieved via oxygen transfer from low-pressure air into a combustion space through which flows the fuel stream optionally mixed with a diluent, such as a $CO_2$ turbine exhaust stream. If desired, one or more elements suitable to provide additional heat input may be included. For example, a gas turbine may be used to provide low temperature heat input utilizing the heat content and temperature level of the gas turbine exhaust. Because of temperature limitations for the gas turbine inlet stream, even if extensive internal cooling and protective coating technologies are utilized, the gas turbine exhaust will typically contain about 12% to about 15% molar oxygen concentration. The hot gas turbine exhaust thus may be used as the oxygen containing low pressure, high temperature feed to an oxygen ion transport membrane (ITM) combustor in place of or in addition to the use of a heated near ambient pressure air stream. The hot oxygen depleted gas exhaust leaving the ITM combustor can be utilized to provide low temperature heat input as needed.

The use of an ITM heater heating the $CO_2$ turbine exhaust can be useful to elevate the turbine exhaust temperature before it enters the hot end of a recuperator heat exchanger. The high-pressure turbine inlet stream can leave the hot end of the recuperator heat exchanger and enter the turbine with no further heating. The maximum turbine inlet temperature can be defined by the maximum temperature that can be tolerated for the recuperator heat exchanger based on the heat exchanger design material of construction, design margins, and legal code requirements. Based on a high operating pressure of about 200 bar to about 400 bar, and utilizing current best design such at the HEATRIC diffusion bonded compact high pressure heat exchangers with current best available high temperature alloys, a turbine inlet temperature of about 750° C. to about 850° C. is presently possible, and it is expected that even higher temperatures can be achieved by utilizing higher temperature alloys.

In one or more embodiments, the efficiency of a power production cycle can be maximized by operating the cycle at the temperature limitation imposed by the recuperator heat exchanger design limitations. For example, an operating temperature range of about 750° C. to about 850° C. for a turbine inlet temperature is presently the upper limit for a high pressure turbine operating without internal cooling of the blades or the inner casing (but could involve some protective coatings applied internally). Reducing turbine inlet temperature from the typical upper range of about 1100° C. to 1200° C. to a lower range of about 750° C. to 850° C. results in a significant drop in the power output for a fixed turbine inlet flow. Surprisingly, this does not result in a corresponding large drop in the overall thermal efficiency of a power production cycle according to the present disclosure. Such thermal efficiency can be in the range of about 52% to about 54% (LHV basis) based on current component design limitations and optimized performance. A system operating under conditions as described herein can retain the ability to capture close to 100% of the $CO_2$ derived from the fuel gas combustion. The gas turbine integration allows 100% $CO_2$ capture from fuel gas entering the ITM combustor to power the power production cycle. The $CO_2$ derived from gas turbine fuel input would normally be vented to the atmosphere. This results in a reduction in overall $CO_2$ capture for a maximum sized gas turbine optionally integrated with the presently disclosed system to a range of about 60% to about 70%.

In some embodiments, the presently disclosed systems and methods can provide a two-stage turbine system utilizing an intermediate heating step with a second ITM heater that provides the maximum achievable efficiency for power production. The turbine used for power production can be a two-stage unit with the first turbine discharging at an intermediate pressure. The discharge stream can then be reheated using an ITM fuel gas combustor to a high temperature before being expanded in a second stage turbine to the final turbine discharge pressure.

In one or more embodiments, a high temperature ceramic oxygen ion transport membrane can be used to transfer oxygen from an $O_2$ containing stream (preferably a heated stream and preferably a low pressure stream) to a stream which contains fuel components (e.g., $CH_4$, $H_2$, CO, high molecular weight hydrocarbons, and mixtures of these components) and optionally $CO_2$ (which stream can be heated and can be at a high pressure). The resulting transferred $O_2$ oxidizes the fuel producing heat and $CO_2$ plus $H_2O$ products. The heat released raises the temperature of the $CO_2$ and combustion products. If desired, the ITM can be configured to only partially combust or oxidize one or more fuel components. For example, a carbonaceous fuel may be partially combusted or oxidized to form at least CO as a partial oxidation product.

In one or more embodiments, the $CO_2$ stream can be a turbine outlet stream from either a first or second turbine which after heating in the ITM unit by combustion of contained fuel components with diffused oxygen eventually becomes the return stream entering a recuperative heat exchanger.

In one or more embodiments, the heated first $CO_2$ stream can be passed in indirect heat transfer to a second high pressure $CO_2$ stream raising the temperature of the second $CO_2$ stream.

In one or more embodiments, the second $CO_2$ stream can be passed into the first power production turbine.

In one or more embodiments, the first or second power production turbine discharge stream at the lowest system pressure is used in whole or in part to provide the first $CO_2$ stream.

In some embodiments, a system and method for power production can be configured so that a fuel is combusted in the presence of a pure oxygen stream to provide heat to a circulating working fluid in a power cycle. Such system and method can be characterized by one or more of the following statements, which can be combined in any order or number.

Oxygen can be provided by diffusion across an oxygen ion transport membrane system.

Oxygen can diffuse from a preheated air stream.

Oxygen can diffuse into a preheated stream of the working fluid in the power cycle which contains components which can be oxidized by reaction with pure oxygen, releasing heat of combustion.

Means for preheating both the feed air stream and feed working fluid before entering the ITM unit can be provided.

Means for generating power from the circulating working fluid in a power cycle using a turbine power generation unit can be provided.

The circulating working fluid can be carbon dioxide.

A power cycle using $CO_2$ as a working fluid can be carried out can particularly include the combustion of a gaseous fuel gas mixed with the turbine exhaust stream using substantially pure oxygen which diffuses through an oxygen ion transport membrane system to preheat the turbine exhaust to a higher temperature.

A recuperative heat exchanger can be used so that the heated turbine exhaust cools while heating the turbine inlet flow.

The $CO_2$ working fluid can be cooled to near ambient temperature and condensed water can be separated.

A compression system can be used which recycles the cooled purified turbine exhaust stream from the turbine discharge pressure to the turbine inlet pressure.

A net $CO_2$ product stream can be derived from oxidation of the carbon present in the fuel gas stream and can be withdrawn at any pressure between the compressor inlet and outlet pressures.

A source of additional heat can be provided to input added heat to the recycle pressurized $CO_2$ stream in addition to the heat provided from the cooling turbine exhaust stream.

The turbine inlet pressure can be about 200 bar to about 400 bar.

The turbine outlet pressure can be about 20 bar to about 40 bar.

The oxygen-containing feed stream to the oxygen ion transport membrane can be air.

The oxygen-containing feed stream to the oxygen ion transport membrane can be a gas turbine exhaust stream.

The pressure of the oxygen-containing feed stream can be 1.4 bar or less.

The turbine can be a two stage unit in which the discharge stream from the first stage turbine is heated in a first oxygen ion transport membrane combustor to become the inlet to the second stage turbine, and the second stage turbine discharge is heated in a second oxygen ion transport membrane combustion unit to become the inlet turbine discharge stream entering the hot end of the recuperator heat exchanger.

The inlet pressure of the second stage turbine can be in the range of about 70 bar to about 120 bar.

A portion of the near ambient temperature turbine exhaust can be recycled and heated in the recuperator heat exchanger to the first or sole turbine inlet temperature then added to the turbine exhaust to raise its temperature and allow variation in the ITM combustor inlet temperatures for both the oxygen containing stream and the turbine exhaust stream.

The geometry of the oxygen ion transport membrane can be in the form of a circular cross-section tube having the low pressure oxygen containing gas on the outside of the tube and the turbine exhaust plus fuel gas streams on the inside of the tube.

The ITM tube can be closed at the down-stream end and provided with an inner tube through which the product heated turbine exhaust is removed.

The oxygen containing stream can flow in a tube placed concentrically with the ITM tube and surrounding the ITM tube.

The three concentric tubes can be mounted vertically with each one sealed into one of three tube sheets contained in a pressure vessel with the upper tube-sheet defining a space having the heated turbine exhaust exit stream, the middle tube sheet defining a space having the inlet turbine exhaust stream, and the lower tube sheet defining a space having the oxygen containing inlet stream.

The outer concentric oxygen containing tube can be open ended so that the depleted oxygen containing stream vents into the pressure vessel and passes upwards to be removed below the lower tube sheet.

In some embodiments, a system for power production can comprise: a power production turbine configured for expanding a working stream comprising recycled $CO_2$ to produce a turbine exhaust stream and to produce power; an oxygen-containing stream source configured to provide an oxygen-containing stream; a fuel source configured for input of a fuel into the turbine exhaust stream; an ion transport membrane system (ITM) configured for receiving the turbine exhaust stream with the input fuel and configured for receiving the oxygen-containing stream, the ITM being effective for diffusion of oxygen from the oxygen-containing stream into the turbine exhaust stream with the input fuel to at least partially combust at least a portion of the input fuel and to provide a heated $CO_2$-containing stream; and a recuperator heat exchanger configured for transferring heat from the $CO_2$-containing stream to the working stream comprising the recycled $CO_2$.

The system can further be defined in relation to any one or more of the following statements, which can be combined in any order or number.

The system can further comprise a separator configured to receive the $CO_2$-containing stream from the recuperator heat exchanger and output a stream of substantially pure $CO_2$.

The system can further comprise at least one compressor configured to compress at least a portion of the substantially pure $CO_2$ and provide the recycled $CO_2$.

The system can further comprise at least one added heat source configured for adding heat to the working stream comprising the recycled $CO_2$ in addition to the heat transferred from the $CO_2$-containing stream.

The system can further comprise one or both of an oxygen-containing stream pre-heater configured for heating the oxygen-containing stream upstream from the ITM and a turbine exhaust stream pre-heater configured for heating the turbine exhaust stream upstream from the ITM.

The oxygen-containing stream source can be air.

The oxygen-containing stream source can be an exhaust stream from a gas turbine.

The power production turbine can comprise a series of at least two turbines.

The system can comprise at least a first ITM and a second ITM.

The ITM can comprise a diffusion membrane that is in the form of a tube, the diffusion membrane having an outer surface configured for contacting the oxygen-containing stream and an inner surface configured for contacting the turbine exhaust stream with the input fuel.

The diffusion membrane that is in the form of a tube can have an upstream end that is open and a downstream end that is closed.

The ITM can comprise an inner metallic tube positioned within the diffusion membrane that is in the form of a tube.

The ITM can comprise an outer metallic tube that is surrounding and is concentric with the diffusion membrane that is in the form of a tube.

The ITM can comprise an outer pressure vessel.

In some embodiments, a method for power production can comprise: expanding a working stream comprising recycled $CO_2$ in a power production turbine to produce a turbine exhaust stream and to produce power; providing an oxygen-containing stream from an oxygen-containing stream source; inputting a fuel from a fuel source into the turbine exhaust stream to form a combined turbine exhaust/fuel stream; passing the oxygen-containing stream and the combined turbine exhaust/fuel stream through an ion transport membrane system (ITM) that is effective for diffusion of oxygen from the oxygen-containing stream into the combined turbine exhaust/fuel stream so as to at least partially combust or oxidize at least a portion of the fuel in the combined turbine exhaust/fuel stream and to provide a heated $CO_2$-containing stream; and heating the working stream comprising the recycled $CO_2$ in a recuperator heat exchanger using heat from the heated $CO_2$-containing stream prior to expanding the working stream comprising the recycled $CO_2$ in the power production turbine.

The method can further be defined in relation to any one or more of the following statements, which can be combined in any order or number.

The method can further comprise purifying the $CO_2$-containing stream to provide a stream of substantially pure $CO_2$.

The method can further comprise g compressing at least a portion of the substantially pure $CO_2$ in at least one compressor to form the recycled $CO_2$.

At least a portion of the recycled $CO_2$ can be in a supercritical state.

The working stream comprising recycled $CO_2$ can be at a pressure of about 200 bar or greater.

The method can further comprise heating the working stream comprising the recycled $CO_2$ using added heat from a source other than from the heated $CO_2$-containing stream.

The method can further comprise heating one or both of oxygen-containing stream and the turbine exhaust upstream from the ITM.

The oxygen-containing stream source can be air.

The oxygen-containing stream source can be an exhaust stream from a gas turbine.

The power production turbine can comprise a series of at least two turbines.

The method can comprise the use of at least a first ITM and a second ITM.

The ITM can comprise a diffusion membrane that is in the form of a tube, the diffusion membrane having an outer surface configured for contacting the oxygen-containing stream and an inner surface configured for contacting the turbine exhaust stream with the input fuel.

The diffusion membrane that is in the form of a tube can have an upstream end that is open and a downstream end that is closed.

The ITM can comprise an inner metallic tube positioned within the diffusion membrane that is in the form of a tube.

The ITM can comprise an outer metallic tube that is surrounding and is concentric with the diffusion membrane that is in the form of a tube.

The ITM can comprise an outer pressure vessel.

The turbine exhaust stream can have a pressure of about 80 bar or less.

The oxygen-containing stream can be at a pressure of no greater than 10 bar.

DETAILED DESCRIPTION OF THE DISCLOSURE

Figure 1A:
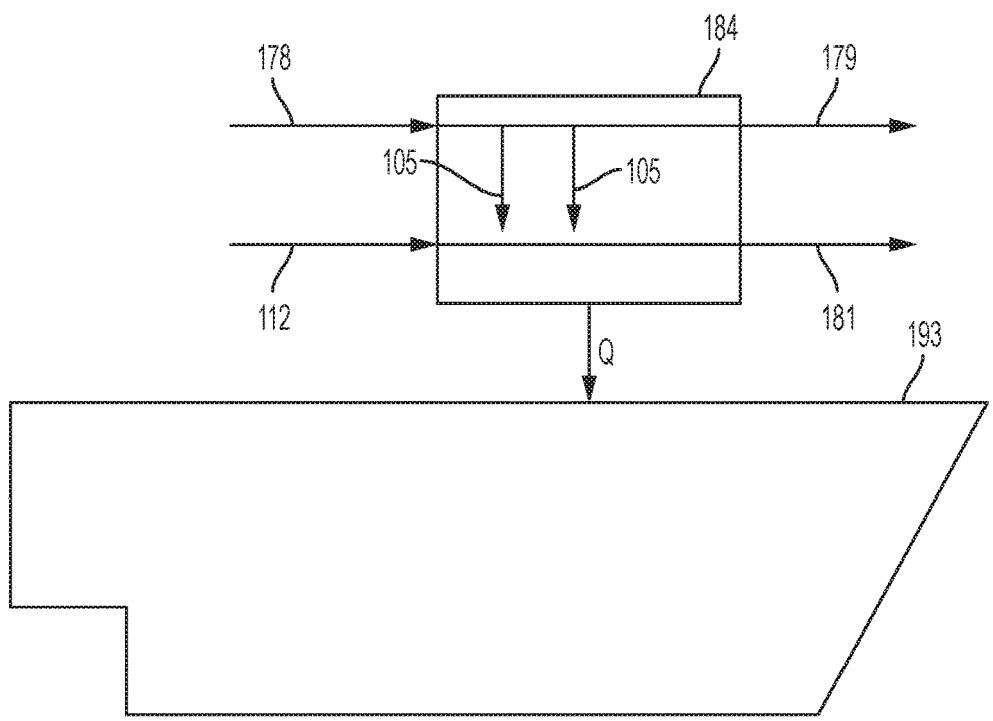
FIG. 1a is a schematic representation of a system and method for power production according to embodiments of the present disclosure.

The present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. For example, unless otherwise indicated, something being described as being a first, second or the like should not be construed to imply a particular order. Also, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

The present disclosure relates to power production systems and methods utilizing an ion transport membrane (ITM) combustor. Such ITM combustor can be combined with a variety of further elements to provide power production systems and methods. Non-limiting examples of elements that may be included in a power production system according to the present disclosure are described in U.S. Pat. No. 8,596,075, U.S. Pat. No. 8,776,532, U.S. Pat. No. 8,959,887, U.S. Pat. No. 8,986,002, U.S. Pat. No. 9,068,743, U.S. Pat. No. 9,416,728, U.S. Pat. No. 9,546,814, U.S. Pat. Pub. No. 2012/0067054, and U.S. Pat. Pub. No. 2013/0213049, the disclosures of which are incorporated herein by reference. Systems and methods as described herein thus may include any combination of embodiments disclosed in the foregoing documents.

High efficiency power production in an oxyfuel combustion method utilizing $CO_2$ as a working fluid can require a separate cryogenic air separator plant to produce oxygen. This must be delivered to the combustor at a controlled molar concentration of about 20% to about 30% preheated to typically over 700° C. The oxygen is diluted with $CO_2$, which requires a separate $O_2/CO_2$ compressor train or, alternatively, a more complex cryogenic air separation plant delivering pure oxygen at the combustor pressure is required with a significantly higher power consumption. In addition, methane used as the fuel in such cycles must be compressed to a pressure of about 305 bar using a high pressure compressor.

In one or more embodiments of the present disclosure, the requirement for one or more of such elements can be eliminated and replaced with an ITM combustor. Moreover, the present disclosure provides for a variety of power production cycles wherein an ITM combustor is utilized as the sole source of oxygen production and/or as the sole combustion element, as well as cycles wherein an ITM combustor may be combined with other oxygen sources (e.g., a cryogenic air separation unit) and/or with one or more different combustors. The ITM combustor may be use in a closed cycle, a semi-closed cycle, or an open cycle system.

An exemplary embodiment is shown in FIG. 1a, wherein an ion transport membrane (ITM) unit 184 operating at temperatures in excess of 700° C. is utilized to provide heat (Q) to a power production cycle 193. The power production cycle 193 may be any cycle wherein a working fluid (e.g., $H_2O$, $CO_2$, or $N_2$) is repeatedly heated and cooled for power generation. The power production cycle 193 may include any number of heating and cooling stages as well as any number of pressurization and expansion stages. As illustrated, the ITM unit 184 is provided with an air inlet stream 178 and a fuel gas (e.g., $CH_4$) stream 112. Within the ITM unit 184, oxygen 105 diffuses from the air stream 178 into the fuel gas stream 112 and, the fuel gas is combusted. The fuel gas stream 112 can optionally be diluted with an inert gas such as $CO_2$. Preferably, a majority (e.g., greater than 50 mol %, greater than 70 mol %, or greater than 80 mol %) of the $O_2$ in the air inlet stream 178 is separated in the ITM unit 184, and a depleted air stream 179 exits the ITM unit. A combustion product stream 181 (which may comprise substantially only $CO_2$ and $H_2O$ or which may include further impurities, depending upon the fuel used) also exits the ITM unit 184, and the combustion product stream may be passed through a power production turbine, vented, or handled via other means recognized in the art. The system illustrated in FIG. 1a may be particularly useful for the provision of heat from the ITM unit 184 into a closed power production system.

Figure 1B:
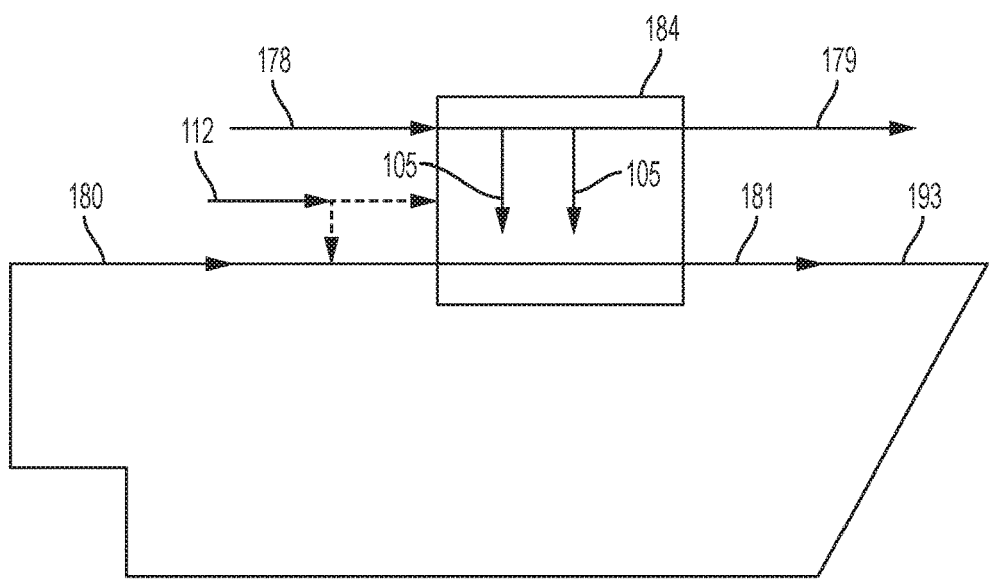
FIG. 1b is a schematic representation of a system and method for power production according to embodiments of the present disclosure.

A further exemplary embodiment is shown in FIG. 1b, wherein an ITM unit 184 is utilized is a semi-closed system. As illustrated, the ITM unit 184 is combined with a power production cycle 193 such that a working fluid stream 180 is passed directly through the ITM unit. As an example, the working fluid stream may comprise $CO_2$ or may be formed substantially completely of $CO_2$. The ITM unit 184 is provided with an air inlet stream 178 and a fuel gas (e.g., $CH_4$) stream 112, which may be injected directly into the ITM unit or may be added to the working fluid stream 180. Again, within the ITM unit 184, oxygen 105 diffuses from the air stream 178 into the mixture of the fuel gas stream 112 and the working fluid stream 180 so that the fuel gas is combusted. The depleted air stream 179 exits the ITM unit, and the combustion product stream 181 exits the ITM unit 184 to be further utilized in the power production cycle 193.

Figure 1C:
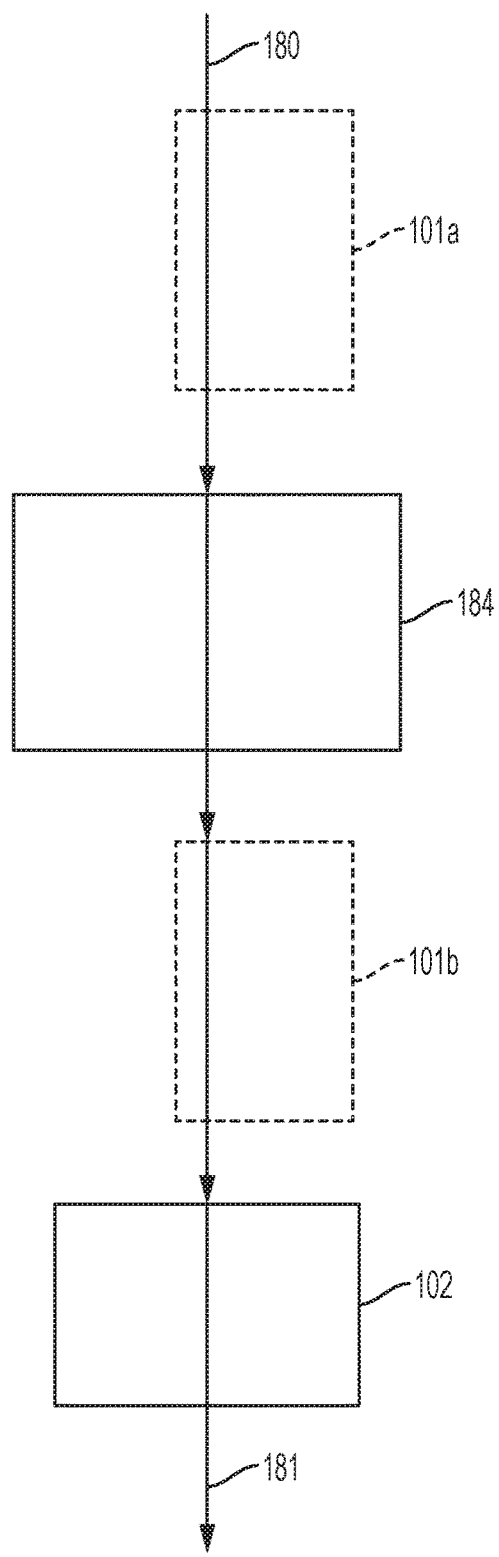
FIG. 1c is a schematic representation of a system and method for power production according to embodiments of the present disclosure.

In one or more embodiments, the system illustrated in FIG. 1b may include further elements that can modify the function of the ITM unit. In some embodiments, the ITM unit may be operated substantially only for the provision of $O_2$. For example, a $CO_2$ working fluid stream and the air stream may be passed through the ITM unit to provide a combined $O_2/CO_2$ stream that can be passed into a combustor for combustion of a gaseous fuel. In other embodiments, the ITM unit may function substantially as a pre-heater. For example, an air stream, a $CO_2$ working fluid stream, and a fuel gas stream may be passed through the ITM unit so that the $CO_2$ working fluid stream is pre-heated before being passed to a combustor with added fuel gas and $O_2$ (such as from an air separation unit). In such embodiments, a further heating element (e.g., a recuperative heat exchanger) may be positioned upstream and/or downstream of the ITM unit. Such embodiments are schematically illustrated in FIG. 1c. As seen therein, a working fluid stream 180 can pass sequentially through an optional heat exchanger 101a, an ITM unit 184, another optional heat exchanger 101b, and a combustor 102, from which a combustion product stream 181 exits. As such, it is evident that one or more aspects of FIG. 1c may be combined with a system as described relative to FIG. 1b.

Figure 2:
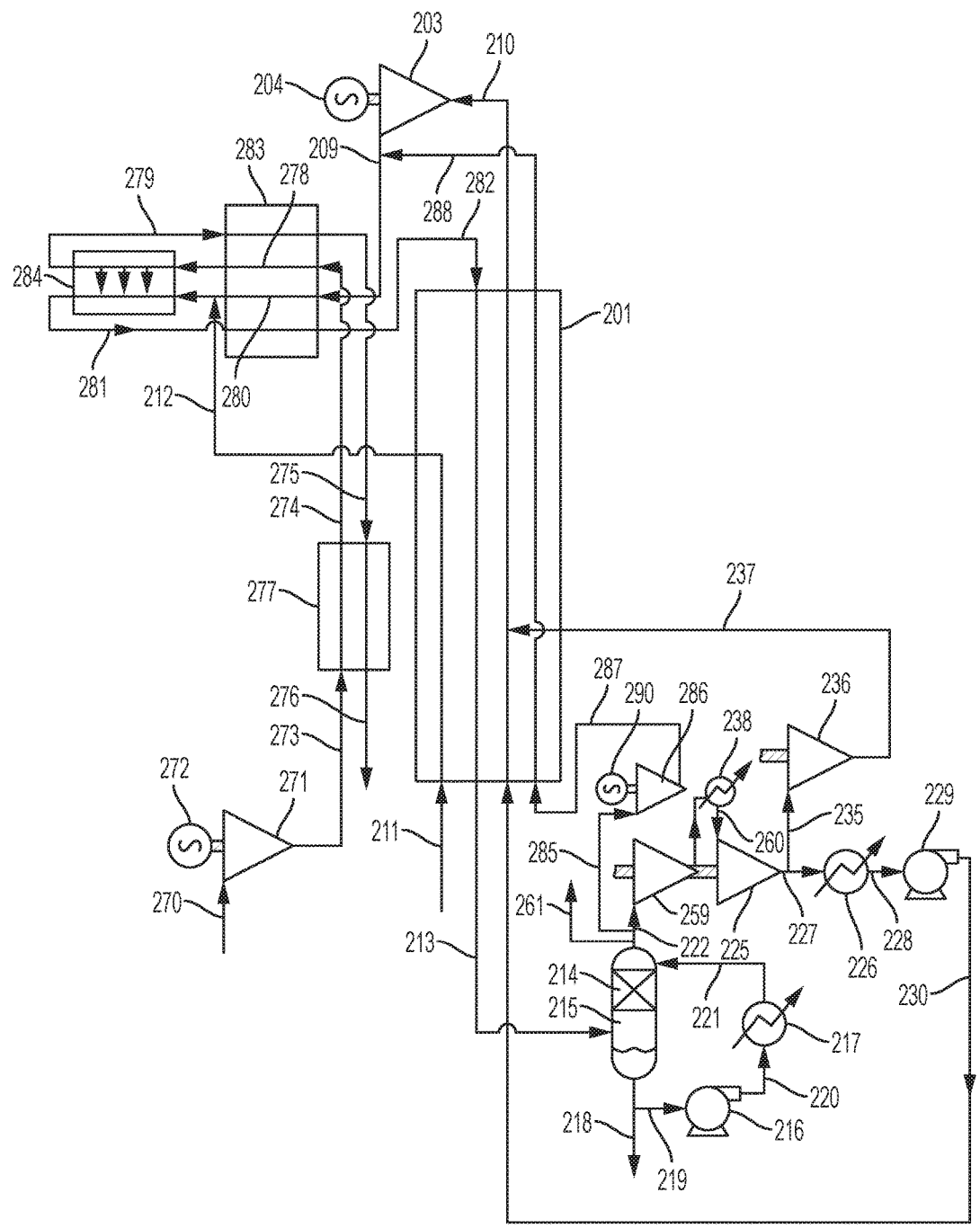
FIG. 2 is a schematic representation of a system and method for power production according to embodiments of the present disclosure.

In some embodiments, systems and methods according to the present disclosure can be described in relation to FIG. 2. Illustrated therein is a system that utilizes a single turbine expanding a high pressure $CO_2$ stream, which has been heated in a recuperative heat exchanger. The turbine exhaust stream is heated in an ITM heater before entering the recuperative heat exchanger where it heats the high pressure $CO_2$ stream.

As illustrated in FIG. 2, an ITM unit 284 is provided with a preheated air inlet stream 278 that enters the ITM unit at a pressure of about 1.25 bar and a temperature of about 750° C. Within the ITM unit 284 there is also a feed of preheated turbine discharge flow 280 (which can comprise substantially only $CO_2$—e.g., at least 98 mol %, at least 99 mol %, or at least 99.5 mol % $CO_2$) at a pressure of about 30 bar and a temperature of about 750° C. and which is mixed with a stream of $CH_4$ 212 at a pressure of about 30 bar that has been preheated to a temperature of about 550° C. in heat exchanger 201. In the ITM unit 284, the turbine discharge flow 280 and the $CH_4$ stream 212 can be characterized as a combined $CO_2/CH_4$ stream. The $CH_4$ stream 212 is taken directly from a natural gas pipeline, stream 211, with no need for a high-pressure compressor. It is understood that, in some embodiments, a different $CH_4$ stream (e.g., natural gas or another carbonaceous, gaseous fuel) may be provided, and the system may include a $CH_4$ compressor. Within the ITM unit 284, oxygen diffuses from the low-pressure air stream 278 into the significantly higher pressure $CO_2/CH_4$ stream because of the very low equilibrium oxygen concentration on the $CO_2/CH_4$ side at temperatures between the inlet at about 750° C. and the outlet at about 1020° C.—i.e., in the range of $<10^{-15}$ bar.

In the illustrated embodiment shown in FIG. 2, the design point for the oxygen diffusion is for 90% of the oxygen in the feed air stream 278 to diffuse across the membrane in the ITM unit 284 leaving a depleted air outlet stream 279 at 1020° C., which is substantially the same outlet temperature for the heated $CO_2$ stream 281 in which all the $CH_4$ that entered the ITM unit has been oxidized to $CO_2$ and $H_2O$. Preferably, the inlet streams (i.e., air, $CO_2$, and $CH_4$) entering the ITM unit 284 are at temperatures of about 700° C. or greater (e.g., about 700° C. to about 1200° C., about 700° C. to about 1000° C., or about 700° C. to about 850° C.) since the higher temperatures favor oxygen ion mobility in the crystal lattice of the perovskite mixed oxide ceramic membrane used in the ITM unit. An ITM preheater heat exchanger 283 is provided to heat the air stream 274 (at a pressure of about 1.3 bar and a temperature of about 682.6° C.) and the $CO_2$ turbine discharge stream 209 (at a pressure of about 30 bar and a temperature of about 506.5° C.) up to the ITM inlet temperature of 750° C. used in the illustrated embodiment. In one or more embodiments, the turbine 209 can have an outlet pressure of about 100 bar or less, about 80 bar or less, about 60 bar or less, or about 40 bar or less (e.g., down to 1 bar). The outlet pressure, for example, can be about 1 bar to about 80 bar, about 5 bar to about 70 bar, about 10 bar to about 60 bar, about 15 bar to about 50 bar, or about 20 bar to about 40 bar. The depleted air stream 275 and the $CO_2/H_2O$ stream 282 leave the preheater 283 at about 840° C.

The CO$_2$/H$_2$O stream 282 at a pressure of about 29.7 bar is cooled in the recuperative heat exchanger 201 leaving as stream 213 at a temperature of about 75° C. This stream is further cooled to about 20° C. against circulating water in a direct contact cooler 215 having a packed section 214 and a water circulation system comprising a pump 216, an indirect water cooler 217 and flow streams 219, 220 and 221. The direct contact cooler 215 functions as a separator to separate excess water produced from CH$_4$ combustion, which water leaves as stream 218. The direct contact cooler 215 thus can provide substantially pure CO$_2$ (e.g., at least 95 mol %, at least 98 mol %, at least 99 mol %, or at least 99.5 mol % CO$_2$) as a cooled discharge stream. The cooled discharge CO$_2$ stream divides. A net CO$_2$ product stream 261 derived from CO$_2$ produced from CH$_4$ oxidation is removed for disposal. In particular, the net CO$_2$ may be removed for sequestration, for use in enhanced oil recovery, for sale, or for other end uses. The remaining CO$_2$ recycle stream 222 is compressed in the two-stage CO$_2$ recycle compressor (wherein stream 238 exiting the first stage compressor 259 is cooled in intercooler 260 prior to passage through the second stage compressor 225) to produce a second stage discharge stream 227 at a pressure of about 70 bar. A portion 235 of the second-stage discharge stream 227 at a temperature of about 51° C. and a pressure of about 70 bar is removed and compressed in an adiabatic compressor 236 to a pressure of about 304 bar and a temperature of about 183.2° C. leaving as stream 237. As discussed below, the adiabatic compressor 236 can function as an added heat source to provide added heat to the CO$_2$ recycle flow in stream 230 in the heat exchanger 201. The remaining portion of stream 227 is cooled to a temperature of about 18° C. in water-cooled heat exchanger 226 producing stream 228 that is a high-density, supercritical CO$_2$ fluid. This stream is compressed to about 304 bar in a multistage centrifugal pump 229. In one or more embodiments, the pressure of the recycle CO$_2$ leaving the multistage centrifugal pump 229 can be about 150 bar or greater, about 200 bar or greater, about 250 bar or greater, or about 300 bar or greater (e.g., about 150 to about 500 bar, about 200 to about 450 bar, or about 250 to about 400 bar). In light of such pressures, the working stream that is expanded in the turbine 203 can be at substantially the same pressure as any of the ranges noted above. The discharge stream 230 at a temperature of about 37° C. is heated in the recuperative heat exchanger 201 to a temperature of about 800° C. against the cooling heated CO$_2$/H$_2$O stream 282 that enters the recuperative heat exchanger at a temperature of about 840° C. The hot CO$_2$ compressor discharge stream 237 enters the heat exchanger 201 where it is mixed with the main CO$_2$ recycle flow in stream 230 so that it provides the source of low temperature externally provided heat input required to achieve high efficiency in the power cycle. The three stages of CO$_2$ compression 259, 225 and 236 are all part of a single CO$_2$ compressor that is mounted on the same shaft as the turbine 203, and the CO$_2$ compressor is driven by the turbine. The total CO$_2$ recycle stream 210 (which can be defined as a working stream comprising CO$_2$) heated to about 800° C. in the recuperative heat exchanger 201 is the feed for the power turbine 203 that drives the electrical generator 204. The depleted air stream 275 at a temperature of about 840° C. is cooled in heat exchanger 277 against an air inlet stream 273 at a temperature of about 45° C. and leaves a cooled depleted air stream 276 at a temperature of about 55° C. and vents to the atmosphere. The inlet air stream 270 is compressed to a pressure of about 1.4 bar and a temperature of about 45° C. in an air blower 271 driven by an electric motor 272. To maintained desired pressure differentials as otherwise described herein, it can be preferable for the inlet air to compressed to a pressure of no greater than 20 bar, no greater than 15 bar, no greater than 10 bar, no greater than 5 bar, or no greater than 2 bar, depending upon the pressure of the turbine exhaust stream (i.e., the CO$_2$/CH$_4$ stream) passed through the ITM against the air stream.

The inlet temperature level for the turbine 203 of 800° C. may vary based upon the temperature limitation of heat exchanger 201 at the operating pressure of 300 bar. Depending on the maximum design stress level in the hot end section of the recuperative heat exchanger 201 the high pressure CO$_2$ pressure could be in the range 200 bar to 400 bar and the inlet temperature of the turbine could be in the range of about 700° C. to 850° C. The temperature level of 800° C. for the turbine inlet means that it is not necessary to provide cooling flow to limit temperatures in the turbine blades and high-pressure casing. This simplifies the turbine and coupled with the absence of the internal combustor gives a much cheaper unit with no loss of efficiency caused by the low temperature cooling CO$_2$ mixing with high temperature expanding CO$_2$.

Optionally there can be a recycle stream of CO2 285, taken from the inlet of the CO$_2$ recycle compressor stream 222 and compressed in a low pressure ratio blower 286 driven by an electric motor 290. The discharge stream 287 is heated to 800° C. in the recuperative heat exchanger 201 leaving as stream 288 and this is mixed with the turbine exhaust stream 209 to raise its temperature. The function of this stream is to allow the heat input to the ITM unit 284 and the preheater heat exchanger 283 to be adjusted to allow variation in the temperature of the air and turbine exhaust ITM inlet streams 278 and 280 to suit the performance of the ITM membrane. In some embodiments, heat produced by the ITM can be utilized to provide a variety of products. For example, at least a portion of the heat may be used to produce stem or other thermally driven by-products.

Elements noted in relation to FIG. 2, such as heat exchangers, pumps, compressors, turbines, coolers, and the like are described in the previously noted U.S. Pat. No. 8,596,075, U.S. Pat. No. 8,776,532, U.S. Pat. No. 8,959,887, U.S. Pat. No. 8,986,002, U.S. Pat. No. 9,068,743, U.S. Pat. No. 9,416,728, U.S. Pat. No. 9,546,814, U.S. Pat. Pub. No. 2012/0067054, and U.S. Pat. Pub. No. 2013/0213049, the disclosures of which are incorporated herein by reference, and such elements may be utilized in any of the embodiments described herein.

In one or more embodiments, an ITM unit (or ITM combustor) can be as illustrated in FIG. 3, FIG. 4, FIG. 5, and FIG. 6. It is based on the use of a plain circular tube for the geometry of the ITM membrane with the 30 bar turbine exhaust plus CH$_4$ fuel within the tube while the low-pressure air surrounds the tube. A ceramic ITM tube can be fabricated from a perovskite mixed oxide material that is described in the literature. See, for example, Repasky et al., ITM Oxygen Technology: Scale-Up Toward Clean Energy Applications, International Pittsburgh Coal Conference, Pittsburgh, Pa., Oct. 15-18, 2012, and U.S. Pat. No. 5,447,555 to Ye et al., the disclosures of which are incorporated herein by reference.

Figure 3:
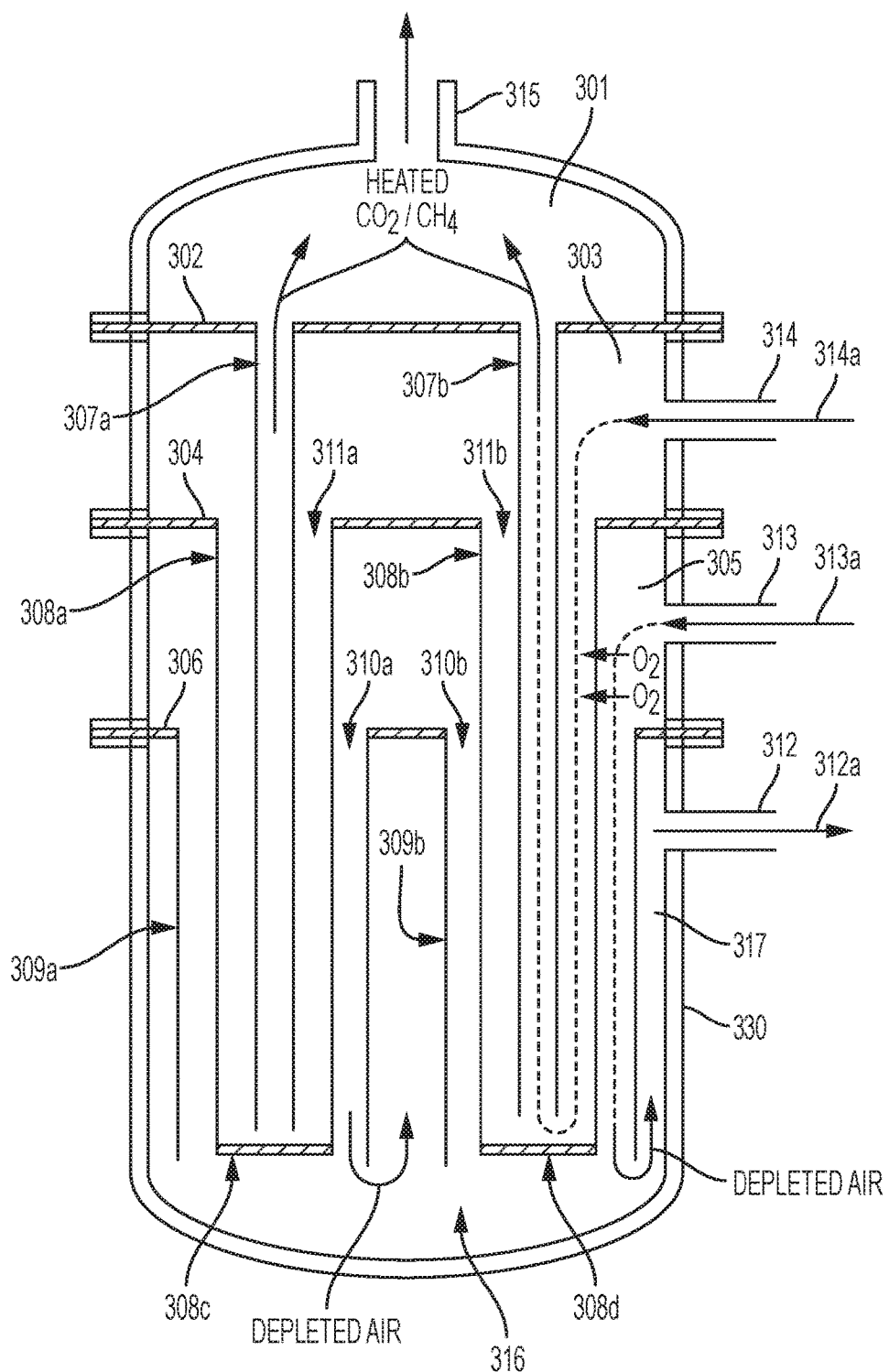
FIG. 3 is a partial cross-section of an ion transfer membrane turbine exhaust heater according to embodiments of the present disclosure.
Figure 6:
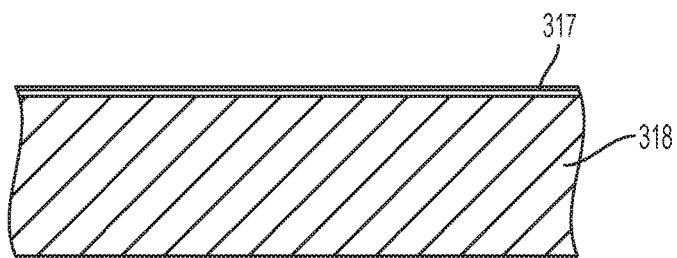
FIG. 6 is a partial cross-section of a wall section of an ITM heater according to embodiments of the present disclosure.

As illustrated in FIG. 3 and FIG. 6, the tube comprises a porous perovskite layer 318 with a very thin impervious diffusion layer 317 of solid perovskite ceramic on the outer surface of the tube. Diffusion of oxygen ions occurs across this thin layer 317 at temperatures between 750° C. and 1020° C. due to the difference in equilibrium oxygen ion centration between the low pressure air side and the higher pressure $CO_2/CH_4$ turbine exhaust plus fuel within the tube. The ITM acts as a short circuited electro-chemical cell with electron transfer across the metallic ions providing ionization of oxygen molecules at the air interface while oxygen molecules give up their electrons and pass out of the ceramic diffusing layer at the $CO_2/CH_4$ interface. The diffusion rate can be calculated as:

$$D \propto \ln [(\underline{P_1})/(P_2)] \times (1/t),$$

wherein D is the diffusion rate, $P_1$ and $P_2$ are the equilibrium partial pressures of oxygen on the air side and the $CO_2/CH_4$ side of the membrane, respectively, and t is the thickness of the solid diffusion layer 317 of perovskite.

FIG. 3 shows one exemplary configuration of an integrated ion transport membrane system (ITM) contained with a pressure vessel 330. The ITM includes a plurality of concentric tubes for flow of the various streams and diffusion of oxygen across the diffusion membrane. As seen in the downward view of the cross-section of FIG. 5, the plurality of tubes includes an outer metallic tube 309 and an inner metallic tube 307 separated by a diffusion membrane tube 308, which is a perovskite ceramic member as otherwise described above. An outer annular space 310 is present between the outer metallic tube 309 and the diffusion membrane tube 308, and an inner annular space 311 is present between the inner metallic tube 307 and the diffusion membrane tube 308. The inner metallic tube 307 is suspended from an upper tube sheet 302, the diffusion membrane tube 308 is suspended from a middle tube sheet 304, and the outer metallic tube 309 is suspended from a lower tube sheet 306.

The $CO_2/CH_4$ feed stream 314a at a temperature of 750° C. enters in nozzle 314 into space 303 and flows downwards through the inner annular spaces 311a and 311b between the inner metallic tubes 307a and 307b and the respective diffusion membrane tubes 308a and 308b. The heated air stream 313a at a temperature of about 750° C. enters through nozzle 313 into space 305 and flows downward through the outer annular spaces 310a and 310b between the diffusion membrane tubes 308a and 308b and the outer metallic tubes 309a and 309b of larger diameter, which are open-ended. The diffusion membrane tubes 308a and 308b have sealed lower ends 308c and 308d, respectively. The heated $CO_2/CH_4$ mixture moves toward the lower end of each diffusion membrane tube and enters the lower ends of the internal metallic tubes 307a and 307b located centrally within the diffusion membrane tubes 308a and 308b. Oxygen diffuses through the perovskite impervious layer 317 and oxidizes the $CH_4$ contained in the $CH_4/CO_2$ stream 314a entering through nozzle 314 releasing heat of combustion which raises the temperature of the $CH_4/CO_2$ stream to 1020° C. The depleted hot air stream 312a is discharged through the lower, open end of the outer metallic tubes 309a and 309b into the base area 316 of the internally insulated pressure vessel 330 and passes upwards through the space 317 within the pressure vessel 330 and is discharged from the nozzle 312 which is just below the lower tube sheet 306. This arrangement allows free downward expansion of the diffusion membrane tube 308a and 308b, the inner metallic tubes 307a and 307b, and the outer metallic tubes 309a and 309b as the temperatures are raised from ambient. The upper tube sheet 302 has a very low-pressure difference across it due to the pressure drop across the diffusion membrane tubes 308a and 308b and the inner metallic tubes 307a and 307b. It only has to support the weight of inner metallic tubes 307a and 307b. The upper surface of the upper tube sheet 302 must be thermally insulated while the lower surface is uninsulated ensuring that the upper tube sheet remains at a temperature of approximately 750° C. that is the temperature of the $CO_2/CH_4$ stream 314a entering the space 303 from nozzle 314. The penetration of the inner metallic tubes 307a and 307b in the upper tube sheet 302 must have insulating collars to prevent the 1020° C. exit flow heating the tube sheet unduly. The collection space 301 above upper tube sheet 302 and the exit pipe 315 are both internally insulated.

Figure 4:
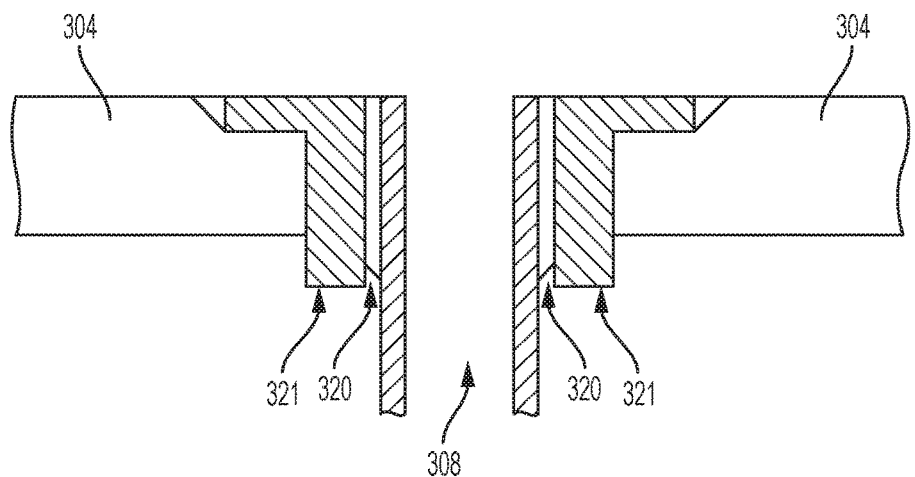
FIG. 4 is a partial cross-section of a portion of the ion transfer membrane turbine exhaust heater of FIG. 3.
Figure 5:
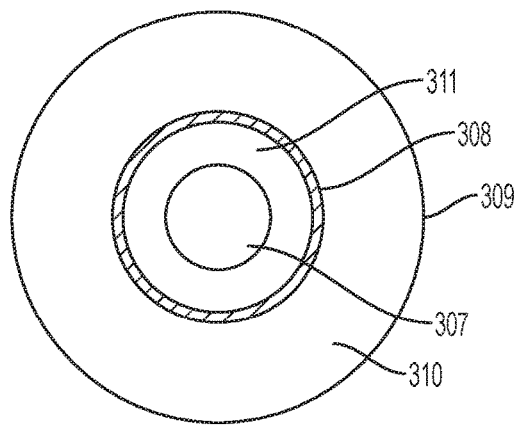
FIG. 5 is a partial cross-section of a tube in tube arrangement of an ITM heater according to embodiments of the present disclosure.

Lower tube sheet 306 only supports the weight of the outer metallic tubes 309a and 309b that contains the air. It has a minimal pressure difference due to pressure drop through to the outer air metallic tubes 309a and 309b and the shell side flow in space 317. Its operating temperature is between 750° C. (the air inlet stream from nozzle 313) and 1020° C. (the depleted air outlet stream leaving through nozzle 312). The lower part of lower tube sheet 306 can be insulated to keep its temperature at approximately 750° C. The most highly loaded middle tube sheet 304 is under pressure difference of about 30 bar at a mean temperature of about 750° C. The current example assumes that the air and $CO_2/CH_4$ inlet streams in nozzles 313 and 314, respectively, are at a temperature of about 750° C. This temperature may be reduced to allow for a feasible tube sheet design at the expense of an initial lower oxygen diffusion rate in the diffusion membrane tubes 308a and 308b and consequently an increase in tube length or an increase in the number of tubes. A critical feature of the design is the method of sealing the diffusion membrane tubes 308a and 308b into the middle tube sheet 304 that is at a temperature of 750° C. The sealing means must accommodate the significant difference between the coefficient of expansion of the diffusion membrane tubes 308a and 308b and the metallic middle tube sheet 304. These objectives can be accomplished as shown in FIG. 4 by firstly using insulating metallic collars 321 surrounding the diffusion membrane tube 308 which is seal welded into the middle tube sheet 304. The joint 320 between the ceramic tube 308 and the collar 321 is filled with a thickness of a metallic alloy which is below its melting point at the $CO_2/H_2O$ and air inlet temperature of 750° C. but which is very ductile and easily and reversibly deformable as the temperature is raised so that the difference in expansion between the collar and the ceramic tube can be accommodated without imposing significant stress on the ceramic tube or providing a leakage path. A suitable material is silver or possibly and alloy of gold nickel or palladium nickel having melting points of about 1000° C. or higher. Note that in the forgoing description, the temperatures which have been specified refer to the overall inlet and outlet temperatures for the ITM unit 284. In practice the concentric tube design allows for heat transfer between the inlet air stream in space 310 and the return air stream within the shell side space 317. Similarly the heated $CO_2$ stream passing through the inner metallic tubes 307a and 307b will transfer heat to the inlet stream 313 passing downwards in the annular space 311.

Other geometries for the ITM unit are possible. For example, various entities have previously developed ITM units used in the fields of oxygen production, fuel gas combustion, and $H_2$+CO syngas production. Moreover, while the foregoing description relates to two inner metallic tubes 307a and 307b, two diffusion membrane tubes 308a and 308b, and two outer metallic tubes 309a and 309b, the ITM unit can comprise only one of each of the respective tubes or may comprise three or more of each of the respective tubes.

As described above, a power production cycle incorporating an ITM unit as described herein can include additional elements useful for compression, combustion, and/or expansion of a stream including a working fluid. In one or more embodiments, a power production cycle including an ITM unit configured for combustion of a fuel can further include a gas turbine. In such embodiments, the hot gas exhaust from the gas turbine can be used as a source of oxygen in the ITM unit and to provide part or all of the low level heat input (e.g., below a temperature of 400° C.) that may be required to provide desired levels of efficiency.

Figure 7:
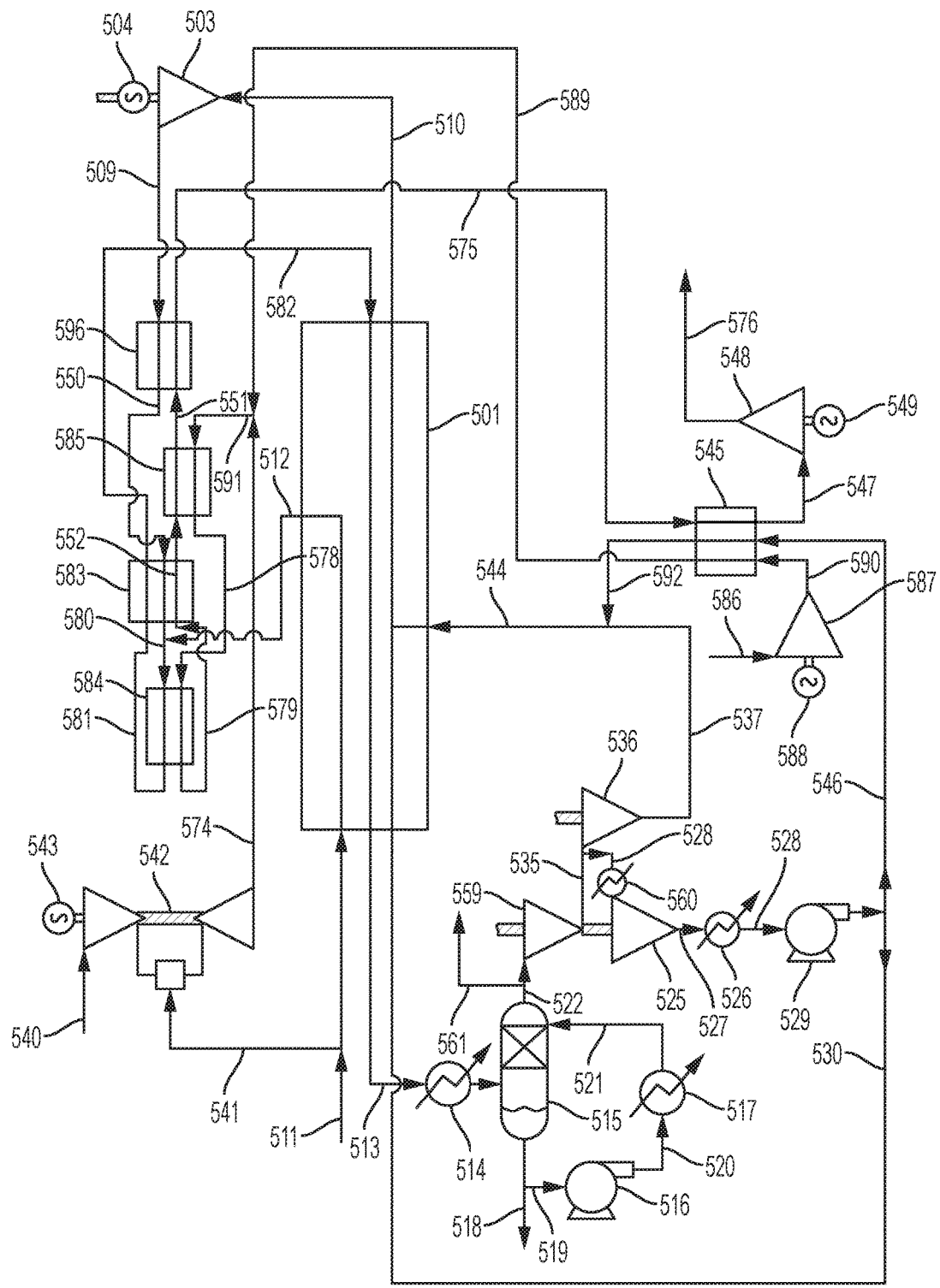
FIG. 7 is a schematic representation of a system and method for power production according to embodiments of the present disclosure.

Exemplary embodiments of a power production cycle combining an ITM unit and a gas turbine are evident in relation to FIG. 7. As illustrated therein, a single stage turbine exhaust passes into an ITM heater that utilizes the hot oxygen containing exhaust from a gas turbine to provide part or all of the oxygen that diffuses through the ITM membrane.

As seen in FIG. 7, a gas turbine 542 with an air inlet flow stream 540 and natural gas fuel flow 541 drives an electric generator 543. A non-limiting example of a gas turbine that may be used is the GE 6F.03 gas turbine. In the illustrated embodiments, the gas turbine 542 has an exhaust stream 574 at a pressure of about 1.03 bar and a temperature of about 601° C. This stream mixes with a pre-heated make-up air-flow stream 589 and the mixed stream 591 enters the heat exchanger 585 at a temperature of about 595.2° C. The stream 591 has sufficient oxygen content based on 90% of the oxygen diffusing through the perovskite membrane in the ITM combustor 584 to provide for the combustion of the $CH_4$ in the turbine exhaust stream. The air stream 589 is produced from an air blower 587 driven by an electric motor 588 and having an air inlet stream 586 and an air discharge stream 590 at a temperature of about 45° C. and a pressure of about 1.4 bar that is then heated against the cooled gas turbine exhaust stream 575 in heat exchanger 545. A portion of the 300 bar recycle $CO_2$ stream 546 is also heated in heat exchanger 545 producing stream 592 at a temperature of about 183.2° C. that mixes with the hot $CO_2$ compressor discharge flow 537 also at approximately the same temperature to produce the $CO_2$ total by-pass flow stream 544, which enters the recuperative heat exchanger 501 and rejoins the main high pressure $CO_2$ recycle flow. The gas turbine discharge passes through six heat exchanger sections that reduce the pressure from 1.03 bar at the gas turbine outlet to 0.68 bar at the exit of heat exchanger 545. Stream 547 is compressed in blower 548 driven by electric motor 549 to a pressure of about 1.02 bar, and the turbine exhaust 576 is discharged to the atmosphere.

The ITM heater 584 receives a preheated oxidant inlet stream 578 at a temperature of about 797° C. and receives preheated $CO_2$ turbine inlet stream 580 at a temperature of about 750° C. that has been mixed with a preheated $CH_4$ stream 512 that leaves the recuperative heat exchanger 501 at a temperature of about 550° C. The $CH_4$ stream 512 is taken directly from a natural gas pipeline, stream 511, with no need for a high-pressure compressor. Such mixing can be useful to avoid a reforming reaction between the methane and $CO_2$ that would cool the $CO_2$ gas below a desired inlet temperature of above 700° C. to the ITM combustor to ensure rapid oxygen diffusion. The heat exchangers 583, 585 and 596 serve to increase the temperature of the $CO_2$ turbine outlet stream 509 that exits the $CO_2$ turbine 503 at a temperature of about 506.5° C. up to a temperature of about 750° C. at the inlet of the ITM combustor 584 while the temperature of the gas turbine exhaust plus air stream 591 is increased from about 597° C. to about 797° C. The $CO_2$ turbine discharge stream 509 passes through heat exchanger 596 to form stream 550, which passes through heat exchanger 583 to form stream 580 into which stream 512 merges. Exiting ITM combustor 584, stream 581 passes back through heat exchanger 583 leaving as stream 582 to enter heat exchanger 501. Also exiting ITM combustor 584, stream 579 passes back through heat exchanger 583 leaving as stream 552, which passes through heat exchanger 585 leaving as stream 551, which passes through heat exchanger 596 and leaves as stream 575.

The $CO_2$ turbine outlet flow stream 582 enters the recuperative heat exchanger 501 having been heated from a temperature of about 506.5° C. to a temperature of about 840° C. The oxygen depleted gas turbine exhaust plus depleted air stream 575 enters the 300 bar $CO_2$ plus air preheater 545 at a temperature of about 520° C. and provides the low temperature added heat required to achieve desired efficiency levels and the heat required to preheat the air stream 590.

The $CO_2$ turbine outlet flow stream 582 exits the recuperative heat exchanger 501 as stream 513, which is further cooled in water cooler 514 and then against circulating water in a direct contact cooler 515 having a packed section and a water circulation system comprising a pump 516, an indirect water cooler 517, and flow streams 519, 520 and 521. Excess water produced from $CH_4$ combustion leaves as stream 518. The cooled discharge $CO_2$ stream divides. A net $CO_2$ product stream 561 derived from $CO_2$ produced from $CH_4$ oxidation is removed for disposal. The remaining $CO_2$ recycle stream 522 is compressed in the two-stage $CO_2$ recycle compressor with first stage compressor 559 and second stage compressor 525. The stream exiting first stage compressor 559 splits with stream 528 being cooled in intercooler 560 prior to passage through the second stage compressor 525 to produce a second stage discharge stream 527. Another portion (stream 535) of the discharge from first stage compressor 559 is removed and compressed in an adiabatic compressor 536 and leaves as stream 537, which combines with stream 592 to form the $CO_2$ total by-pass flow stream 544. Stream 527 exiting the second stage compressor 525 is cooled in water-cooled heat exchanger 526 producing stream 528 that is a supercritical high-density $CO_2$ fluid. This stream is compressed in a multistage centrifugal pump 529. The stream exiting the multistage centrifugal pump 529 divides into discharge stream 530 and recycle $CO_2$ stream 546. Discharge stream 530 is heated in the recuperative heat exchanger 501 against $CO_2$ turbine outlet flow stream 582 and combines with the $CO_2$ total by-pass flow stream 544 to form stream 510 that passes to the $CO_2$ turbine 503 at 800° C. that drives the electrical generator 504.

The addition of a gas turbine results in a significant increase in net power output at the same overall efficiency as the power production cycle that does not include the gas turbine. In some embodiments, an existing gas turbine combined cycle power station can be retrofitted to a power production cycle utilizing recycled $CO_2$ as a working fluid and also including an ITM unit as described herein. This can be useful to increase power output and reduce $CO_2$ emission per kWh of electricity produced by up to 65% to comply with future $CO_2$ emission regulations.

The thermal efficiency of the proposed system can be significantly improved by using a two stage $CO_2$ turbine with reheating between the stages. The first stage turbine takes its inlet flow directly from the recuperative heat exchanger, for example, at a temperature of about 800° C. and a pressure of about 300 bar. The second stage turbine discharge flow enters the recuperative heat at a temperature of about 815° C. and a pressure of about 30 bar having been heated in two separate ITM heaters in series. In such two-stage system, the second turbine inlet temperature can be increased to about 1000° C. in an intermediate pressure heat exchanger against the heated 30 bar turbine exhaust. This higher temperature will be acceptable in the design of the intermediate re-heater due to the selection of the maximum allowable intermediate pressure. The selected intermediate pressure is in the range of about 70 bar to about 120 bar in some embodiments. For this particular case the selected intermediate pressure can be about 95 bar. The second ITM heater raises the 30 bar second stage turbine outlet flow from the re-heater to about 815° C.

Figure 8:
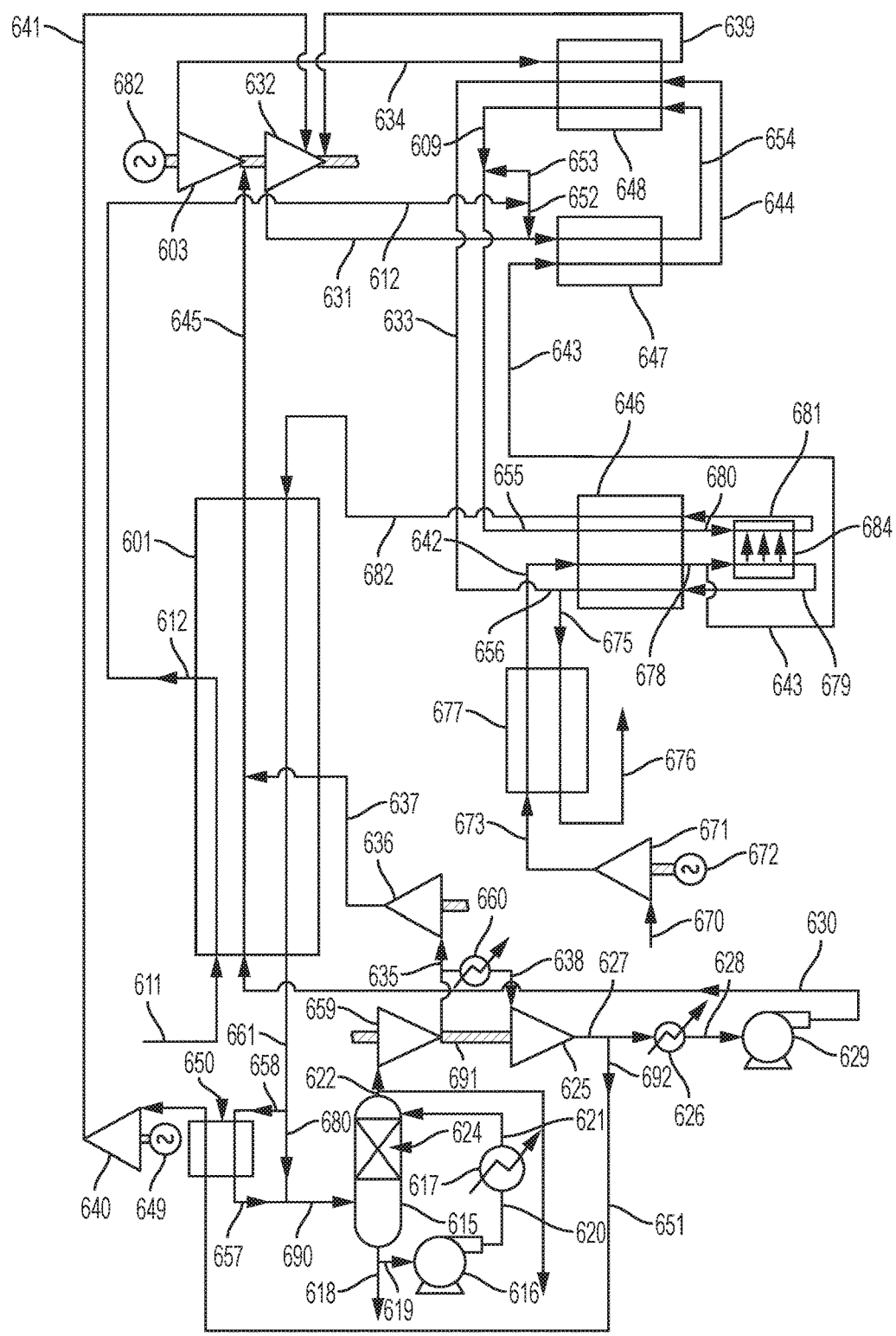
FIG. 8 is a schematic representation of a system and method for power production according to embodiments of the present disclosure.

Further embodiments of the disclosure are illustrated in relation to FIG. 8. Illustrated therein is a two stage turbine system with both turbine exhaust flows being heated in ITM heaters and with the heated exhausts streams being used to heat the two turbine inlet streams. As such, it is evident that the present systems and methods can incorporate a plurality of turbines and/or a plurality of ITM heaters. Moreover, if desired, a plurality of ITM heaters may be utilized in parallel in order to allow for lower loads on the individual heaters.

Efficiencies may be increased by using two turbines in series operating across the total pressure ratio of typically about 300 bar to about 30 bar. In FIG. 8, the first turbine 603 operates with an inlet pressure of about 300 bar and a temperature of about 800° C. with its inlet stream coming directly from the recuperative heat exchanger 601. The turbine has an outlet pressure in the range of about 70 bar to about 120 bar. This pressure range is chosen to allow the outlet pressure to be low enough to permit this stream to be heated in a heat exchanger to about 1000° C. yet high enough to maximize the power output of the second stage turbine 632 discharging at typically about 30 bar. Using current high nickel content alloys with a diffusion bonded heat exchanger fabrication method typified by the HEATRIC heat exchangers, this temperature/pressure combination is possible. This pressure ratio together with the very high inlet and outlet pressures of the first stage can also allow the uncooled first stage to be a radial inflow centrifugal wheel design rather than an axial bladed turbine configuration for large power output systems of 300 Mw or more. For the worked examples in the results section the first stage turbine flow is 7.5 million lb/hr (3.4 million kg/hr). The inlet volumetric flow is about 24700 m$^3$/hr that would result in a centrifugal turbine wheel diameter of less than 1 meter for a 290 MW net power output. The use of a single radial flow turbine wheel for the first stage would be particularly attractive for smaller sized plants. The first stage turbine outlet flow in stream 634 at a temperature of about 650° C. to about 750° C. is heated in heat exchanger 648 to a temperature of about 900° C. to about 1100° C., and this is the inlet flow in stream 639 to the second stage turbine 632. The heat is provided by the discharge $CO_2$ flow (at about 30 bar) from the second stage turbine 632 which has been heated to a temperature of about 900° C. to about 1100° C. in a first ITM heater. The second stage turbine outlet flow leaving the heat exchanger is then heated to a temperature of about 810° C. to about 850° C. in a second ITM heater before entering the recuperative heat exchanger to heat the first stage turbine $CO_2$ inlet stream to about 800° C.

A recycle $CO_2$ stream 645 at a pressure of about 300 bar and a temperature of about 800° C. enters a first stage turbine 603 and is discharged as stream 634 at about 95 bar and about 691° C. It is heated in heat exchanger 648 to about 1010° C. and passes as stream 639 to the second stage turbine 632 leaving at about 30 bar and about 799° C. as stream 631. This stream enters a first stage ITM combustor 647 after mixing with a quantity 652 of $CH_4$ stream 612 at a pressure of about 30 bar and a temperature of about 550° C. which has been heated in the recuperative heat exchanger 601. The $CH_4$ stream 612 is taken directly from a natural gas pipeline, stream 611, with no need for a high-pressure compressor. The methane is combusted in 647 using pure oxygen that diffuses from a preheated air stream 643 at a pressure of about 1.2 bar and a temperature of about 750° C. The depleted air stream 644 and the heated turbine outlet stream 654 from the second stage turbine 632 leave the ITM combustor 647 at a temperature of about 1020° C. and enter heat exchanger 648 to provide the preheat for turbine inlet flow stream 639 for the second stage turbine 632.

The cooled turbine discharge flow 609 leaving the heat exchanger 648 at a temperature of about 700° C. is mixed with a quantity 653 of $CH_4$ stream 612 at a temperature of about 550° C. and a pressure of about 30 bar to form combined stream 655. An air inlet stream 642 (at a pressure of about 1.3 bar and a temperature of about 666° C.) together with stream 655, are heated in a preheater 646 to about 750° C. The heated $CO_2$ stream 680 and the heated air stream 678 leaving preheater 646 and enter the ITM heater 684 at sufficiently high temperature to ensure rapid oxygen diffusion to optimize the design of the ITM heater 684. The combusted and heated $CO_2$ stream 681 and the depleted air stream 679 exiting the ITM heater 684 then pass through the preheater 646 to provide the necessary preheat required. The preheated air stream 678 heated in 646 to a temperature of about 750° C. is divided so that part of the stream provides oxygen in ITM combustor 684 and the remaining stream 643 provides oxygen in first ITM combustor 647. The total depleted air streams leaving heat exchangers 646 and 648 as stream 656 and stream 633, respectively, are combined as stream 675 that enters air preheater heat exchanger 677 and is discharged to the atmosphere at about 55° C. as stream 676. The inlet air stream 670 is compressed to a pressure of about 1.4 bar in compressor 671 by electric motor 672. The discharge stream 673 from compressor 671 is heated in heat exchanger 677 to about 666° C. leaving as stream 642.

The heated $CO_2$ discharge stream 682 leaving the preheater 646 at a temperature of about 815° C. enters the recuperative heat exchanger 601 where it is cooled to about 75° C. and exits as stream 661. A side-stream 658 from the stream 661 passes through a heat exchanger 650 leaving at about 25° C. as stream 657 where it rejoins with the total $CO_2$ stream 680 (at about 29 bar), and the thus-formed total $CO_2/H_2O$ stream 690 enters the direct contact water cooler 615 equipped with a packed counter-current flow section 624. The heat exchanger 650 has an inlet $CO_2$ stream 651 at a temperature of about 51° C. and a pressure of about 70 bar taken from the discharge 692 of the second stage $CO_2$ recycle compressor 625 which is at a temperature of about 70° C. This stream that comprises about 5% of the total $CO_2$ recycle flow is compressed to about 96 bar and a temperature of about 227° C. in compressor 640 driven by electric motor 649. The discharge stream 641 enters turbine two 632 to provide internal cooling service. Note that the operating temperature of the second stage turbine 632 necessitates the use of internal cooling of turbine blades and inner casing together with provision of protective coatings on high temperature internals. There is a water circulation system associated with the water cooler 615 comprising a water pump 616 and an indirect water cooler 617 with circulation lines 619, 620 and 621. The net liquid water product stream 618 formed from the $CH_4$ combustion product leaves the base of the direct contact cooler 615.

The cooled $CO_2$ stream 622 exiting the water cooler 615 at a temperature of about 18° C. divides into two streams.

The net $CO_2$ product stream 691 leaves the system at a temperature of about 18° C. and a pressure of about 29 bar. The bulk of the cooled $CO_2$ stream 622 at about 29 bar is compressed to about 45 bar and a temperature of about 51° C. in a first stage $CO_2$ recycle compressor 659. The discharge flow divides into two parts. Approximately 59.4% of the total $CO_2$ stream 622 is cooled to about 18° C. in the second stage intercooler 660 to form stream 638, which enters the second stage $CO_2$ recycle compressor 625. About 35.6% of the total CO2 stream (as stream 635) enters a third stage $CO_2$ compressor 636 which has an outlet stream 637 at about 183.2° C. and a pressure of about 305 bar which then joins the main $CO_2$ recycle stream 630 at about 300 bar and about 183° C. in the recuperative heat exchanger 601. As before, the third stage $CO_2$ compressor 636 can function as an added heat source so that the heated stream 637 provides low grade heating to the recycle $CO_2$ stream 630 in the heat exchanger 601. The added heat is in addition to the recuperative heating of the recycle $CO_2$ stream 630 using heat from the exhaust stream 682 from the ITM 684. The $CO_2$ recycle compressor stages 659, 625 and 636 are all part of a single compressor train which is driven by a shaft extension from the two stage turbines 603 and 632 that are themselves within a single turbine casing or assembly. The turbines drive an electrical generator 682. The discharge flow stream 692 from the second stage compressor 625 at a temperature of about 51° C. divides into a stream 651 comprising about 5% of the flow originally in stream 622 that becomes the cooling stream 641 for turbine 632 and the remaining $CO_2$ recycle flow stream 627. This stream 627 is cooled in a water cooler 626 to about 18° C. to form supercritical $CO_2$ stream 628 at a density of about 830 kg/m³. The supercritical high density $CO_2$ fluid is pumped in a multistage centrifugal pump 629 to about 304 bar and about 37° C. Exiting stream 630 then enters the recuperative heat exchanger 601 where it is heated to become the major portion of the first turbine inlet flow.

It will be apparent to those skilled in the art that in practice necessary by-pass lines, vent lines, purge gas lines, plus control valves, vents, instrumentation lines and other necessary systems will be added to the process to facilitate all operating modes and ensure safe operating conditions for the units. For example, during start-up, it may be desirable to bypass one or more of the heat exchangers and/or one or more turbines until a defined set of operating conditions (e.g., operating temperature, pressure, flow rate, etc.) has been achieved.

The following table compares Cases 1, 2 and 3 (corresponding to the systems illustrated in FIG. 2, FIG. 7, and FIG. 8, respectively) with the base case that is a conventional $CO_2$ cycle power system with a cryogenic air separation system operating at ISO conditions with oxygen produced at 305 bar pressure directly from the ASU. In all cases, the total $CO_2$ flow entering the turbine at 300 bar pressure is 7.5×10⁶ lb/hr (77286.08 kg mols/hr), and the first turbine inlet pressure is 300 bar. The single stage turbine has an exit pressure of 30 bar. The two stage turbine has a first stage exit pressure of 95 bar (which is the approximate inlet pressure of the second stage turbine) and a second stage turbine exit pressure of 30 bar. The fuel is pure methane. All $CO_2$ product is produced at 29 bar pressure. Electric generator plus transformer losses of 1% of net turbine shaft power are taken for CASES 1, 2 and 3.

| Parameter | Base Case | Case 1 | Case 2 | Case 3 |
|---|---|---|---|---|
| Net Power Output (MW) | 292.23 | 235.53 | 325.87 | 285.90 |
| Efficiency (LHV basis) | 57.24 | 53.31 | 53.49 | 59.56 |
| Turbine one inlet temperature (° C.) | 1154 | 800 | 800 | 800 |
| Turbine one inlet pressure (bar) | 300 | 300 | 300 | 300 |
| Turbine one outlet temperature (° C.) | 725.6 | 506.5 | 506.5 | 690.9 |
| Turbine one outlet pressure (bar) | 30 | 30 | 30 | 95 |
| Turbine two inlet temperature (° C.) | — | — | — | 973.1 |
| Turbine two inlet pressure (bar) | — | — | — | 95 |
| Turbine two outlet temperature (° C.) | — | — | — | 799 |
| Turbine two outlet pressure (bar) | — | — | — | 30 |
| Parasitic power (MW) | 151.51 | 94.16 | 83.82 | 95.1 |
| Gross turbine power (MW) | 441.84 | 329.69 | 329.69 | 381.0 |
| Gas turbine power | — | — | 80 | — |
| $CO_2$ Recovery (% of C in $CH_4$ Fuel) | 100 | 100 | 63.55 | 100 |

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for power production comprising:
    a power production turbine configured for expanding a working stream comprising recycled $CO_2$ to produce a turbine exhaust stream and to produce power;
    an oxygen-containing stream source configured to provide an oxygen-containing stream;
    a fuel source configured for input of a fuel into the turbine exhaust stream;
    an ion transport membrane system (ITM) configured for receiving the turbine exhaust stream with the input fuel and configured for receiving the oxygen-containing stream, the ITM being effective for diffusion of oxygen from the oxygen-containing stream into the turbine exhaust stream with the input fuel to at least partially combust at least a portion of the input fuel and to provide a heated $CO_2$-containing stream; and
    a recuperator heat exchanger configured for transferring heat from the $CO_2$-containing stream to the working stream comprising the recycled $CO_2$.

2. The system of claim 1, further comprising a separator configured to receive the $CO_2$-containing stream from the recuperator heat exchanger and output a stream of substantially pure $CO_2$.

3. The system of claim 2, further comprising at least one compressor configured to compress at least a portion of the substantially pure $CO_2$ and provide the recycled $CO_2$.

4. The system of claim 1, further comprising at least one added heat source configured for adding heat to the working stream comprising the recycled $CO_2$ in addition to the heat transferred from the $CO_2$-containing stream.

5. The system of claim 1, further comprising one or both of an oxygen-containing stream pre-heater configured for heating the oxygen-containing stream upstream from the ITM and a turbine exhaust stream pre-heater configured for heating the turbine exhaust stream upstream from the ITM.

6. The system of claim 1, wherein the oxygen-containing stream source is air.

7. The system of claim 1, wherein the oxygen-containing stream source is an exhaust stream from a gas turbine.

8. The system of claim 1, wherein the power production turbine comprises a series of at least two turbines.

9. The system of claim 1, wherein the system comprises at least a first ITM and a second ITM.

10. The system of claim 1, wherein the ITM comprises a diffusion membrane that is in the form of a tube, the diffusion membrane having an outer surface configured for contacting the oxygen-containing stream and an inner surface configured for contacting the turbine exhaust stream with the input fuel.

11. The system of claim 10, wherein the diffusion membrane that is in the form of a tube has an upstream end that is open and a downstream end that is closed.

12. The system of claim 10, wherein the ITM comprises an inner metallic tube positioned within the diffusion membrane that is in the form of a tube.

13. The system of claim 10, wherein the ITM comprises an outer metallic tube that is surrounding and is concentric with the diffusion membrane that is in the form of a tube.

14. The system of claim 10, wherein the ITM comprises an outer pressure vessel.

15. A method for power production, the method comprising:
expanding a working stream comprising recycled $CO_2$ in a power production turbine to produce a turbine exhaust stream and to produce power;
providing an oxygen-containing stream from an oxygen-containing stream source;
inputting a fuel from a fuel source into the turbine exhaust stream to form a combined turbine exhaust/fuel stream;
passing the oxygen-containing stream and the combined turbine exhaust/fuel stream through an ion transport membrane system (ITM) that is effective for diffusion of oxygen from the oxygen-containing stream into the combined turbine exhaust/fuel stream so as to at least partially combust at least a portion of the fuel in the combined turbine exhaust/fuel stream and to provide a heated $CO_2$-containing stream; and
heating the working stream comprising the recycled $CO_2$ in a recuperator heat exchanger using heat from the heated $CO_2$-containing stream prior to expanding the working stream comprising the recycled $CO_2$ in the power production turbine.

16. The method of claim 15, further comprising purifying the $CO_2$-containing stream to provide a stream of substantially pure $CO_2$.

17. The method of claim 16, further comprising compressing at least a portion of the substantially pure $CO_2$ in at least one compressor to form the recycled $CO_2$.

18. The method of claim 17, wherein at least a portion of the recycled $CO_2$ is in a supercritical state.

19. The method of claim 15, wherein the working stream comprising recycled $CO_2$ is at a pressure of about 200 bar or greater.

20. The method of claim 15, further comprising heating the working stream comprising the recycled $CO_2$ using added heat from a source other than from the heated $CO_2$-containing stream.

21. The method of claim 15, further comprising heating one or both of oxygen-containing stream and the turbine exhaust upstream from the ITM.

22. The method of claim 15, wherein the oxygen-containing stream source is air.

23. The method of claim 15, wherein the oxygen-containing stream source is an exhaust stream from a gas turbine.

24. The method of claim 15, wherein the power production turbine comprises a series of at least two turbines.

25. The method of claim 15, wherein the system comprises at least a first ITM and a second ITM.

26. The method of claim 15, wherein the ITM comprises a diffusion membrane that is in the form of a tube, the diffusion membrane having an outer surface configured for contacting the oxygen-containing stream and an inner surface configured for contacting the turbine exhaust stream with the input fuel.

27. The method of claim 26, wherein the diffusion membrane that is in the form of a tube has an upstream end that is open and a downstream end that is closed.

28. The method of claim 26, wherein the ITM comprises an inner metallic tube positioned within the diffusion membrane that is in the form of a tube.

29. The method of claim 26, wherein the ITM comprises an outer metallic tube that is surrounding and is concentric with the diffusion membrane that is in the form of a tube.

30. The method of claim 26, wherein the ITM comprises an outer pressure vessel.

31. The method of claim 15, wherein the turbine exhaust stream has a pressure of about 80 bar or less.

32. The method of claim 15, wherein the oxygen-containing stream is at a pressure of no greater than 10 bar.

* * * * *